Sept. 6, 1966 — W. T. COLLINS, JR — 3,271,068
CONVERTIBLE TOP LATCHING MECHANISM
Filed Nov. 13, 1964
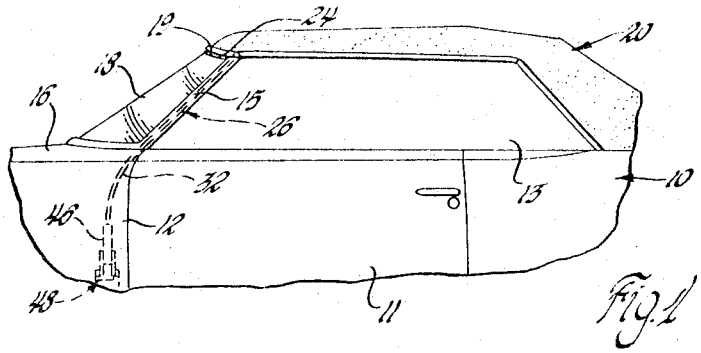
Fig. 1
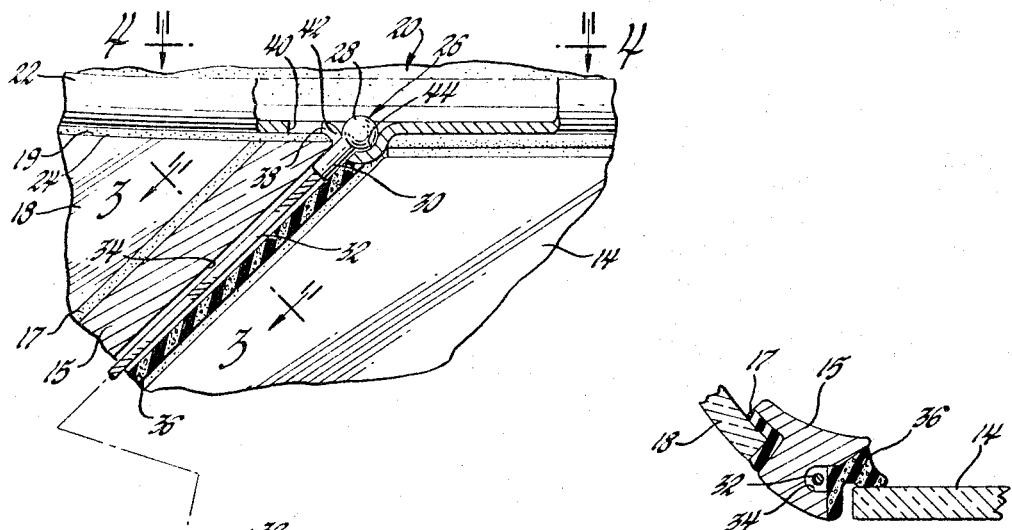
Fig. 3
Fig. 4
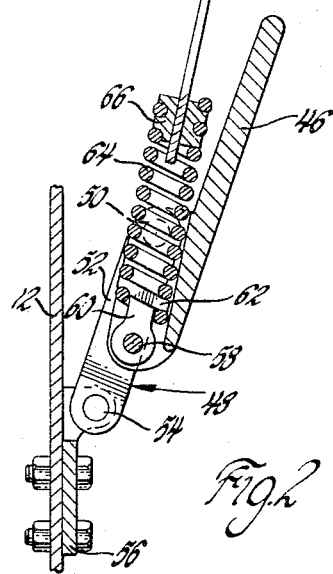
Fig. 2
INVENTOR.
William T. Collins, Jr.
BY
Edward E. James
ATTORNEY United States Patent Office 3,271,068
Patented Sept. 6, 1966

3,271,068
CONVERTIBLE TOP LATCHING MECHANISM
William T. Collins, Jr., Birmingham, Mich., assignor to General Motors Corporation, Detroit, Mich., a corporation of Delaware
Filed Nov. 13, 1964, Ser. No. 410,879
7 Claims. (Cl. 296—120)

This invention relates to latch mechanisms adapted to secure a convertible top in a raised position closing the passenger compartment of an automobile vehicle.

The instant invention contemplates an improved top latching mechanism of simple inexpensive construction having a latch member supported outwardly of the upper end of a windshield mounting pillar and operably connected through the pillar to a remote actuator capable of easily providing and maintaining adequate top locking and sealing loads on a latch engaged top supporting frame member.

In an illustrative vehicle, two top latching mechanisms constructed in accordance with the invention are partially supported by two laterally spaced windshield mounting pillars. These latch mechanisms are operable to effect top locking and sealing engagement between a top supporting front rail member and the transverse upper edge pillar supported windshield. Each pillar mounted latch mechanism includes a headed latch member secured to the upper end of a flexible latch supporting cable. The two latch members are shiftable between an extended unlatched position and a retracted top locking position by linear movement of their respective mounting cables relative to a guide housing formed between a groove or channel opening to a door jamb face on each pillar and a door window engaging weatherseal mounted thereon. The lower end of each latch operating cable is resiliently connected to an overcenter toggle linkage and actuating lever assembly mounted below the pillar in the side kick panel portion of the front seat compartment.

During closing movement of the convertible top, the head of the extended latch member normally passes through the large diameter end of a keyhole shaped keeper slot formed in a pillar engaging end corner of a front rail member of a top supporting frame. Final forward movement of the front rail member to its extreme closed position carries the narrow portion of the keeper slot forwardly of the cable secured portion of the latch member to a position wherein the latch head is engageable with a retaining socket formed in the bottom wall of the front rail member. Such top locking engagement is subsequently effected by movement of the pillar mounted cable downwardly by suitable operation of the kick panel mounted actuating lever to its overcenter locked position.

The foregoing and other objects, advantages and features of the invention will be apparent from the following description of the illustrative embodiment having reference to the accompanying drawing, in which:

FIGURE 1 is a fragmentary side elevational view of a portion of a convertible automotive vehicle body and shows the intended operational environment of the illustrative latch mechanism;

FIGURE 2 is an enlarged fragmentary sectional view of vertically offset portion of the illustrative latch mechansim and shows the top locking positions assumed by the several latch elements and the overcenter spring-biased actuating lever connected to the lower end of the latch operating cable;

FIGURE 3 is an enlarged fragmentary sectional view taken through the windshield mounting pillar substantially in the plane 3—3 of FIGURE 2; and FIGURE 4 is a fragmentary plan view taken substantially in the direction indicated at 4—4 of FIGURE 2 and shows the top supporting frame member in latch maintained sealing engagement with the upper end of the adjacent pillar and the upper edge of the windshield.

Referring more particularly to FIGURE 1, a portion of a sports type convertible is indicated generally by the reference numeral 10. A door 11 is suitably hinged on the door jamb portion 12 of the body and opens to provide access to a body defined passenger compartment 13. A side window 14 is slidably mounted in the door 11 and is operably connected for regulated actuation between a retracted position and a raised closed position partially shown in FIGURES 2 and 3.

While only left-hand side portions of the vehicle body are shown in the several drawing figures, similar corresponding portions on the opposite right-hand side of the body are reversed in configuration in accordance with common automotive design practices. It will thus be apparent that the following description is equally applicable to both the left and right sides of the vehicle although it is primarily related to the illustrated left side of the body and to the illustrative left-hand top latching mechanism shown in FIGURES 2–4.

Two laterally spaced pillars 15 are vertically inclined and extended upwardly from the two door hinge mounting jamb portions of the body. These two pillars cooperate with a transverse cowl portion 16 of the body and a resilient weatherseal 17 of angled cross-section to mount a curved windshield 18 of suitable safety glass in substantially flush relation to the curved outer end surfaces of the two corner pillars. The windshield is thus supported forwardly of the passenger compartment and extends transversely of the vehicle body. In the illustrative vehicle, the upper edge 19 of the windshield is unsupported and coextensive with the upper end surfaces of the two pillars 15.

A foldable top 20 of suitable fabric or plastic sheet material is shown in the frame support raised position enclosing the passenger compartment. The top supporting frame may be articulated in any conventional manner for controlled movement between a retracted top opened position and its extended or raised compartment closing position. The top frame includes a front rail member 22 which is bowed transversely of the vehicle. During movement of the frame to its closed position, the front rail member 22 is carried or swung forwardly and downwardly into engagement with the transverse upper edge of the windshield and the windshield mounting pillars. A resilient weathersealing member 24 may be secured to the undersurface of the front rail member 22 as shown in FIGURE 2 and assures proper sealing engagement with the upper edge of the windshield and the upper end surfaces of the windshield mounting pillars.

In accordance with the invention, two latch mechanisms 26 are supported by and extend longitudinally of the windshield mounting pillars. These latch mechanisms are remotely operable to engage and lock the top supporting front rail member 22 in its raised windshield engaging position. As shown in FIGURES 2–4, each latch mechanism 26 includes a ball-headed bolt or latch member 28 which projects upwardly and outwardly of its supporting pillar 15 and has a cylindrical shank portion 30 of reduced diameter suitably secured to the upper end of a flexible operating wire or cable 32. This latch operating cable supports the latch member 28 for substantially linear movement between an extended top unlatching position and a partially retracted top locking position. The cable 32 of the illustrative embodiment is slidably mounted in a guide housing groove 34 formed in and opening to the door jamb face of the pillar 15. This cable mounting groove extends longitudinally of the pillar and is closed by a resilient weatherstrip 36 suitably secured to the jamb face of the pillar. The weatherstrip 36 is sealingly engageable with the adjacent edges of the door 11 and of the raised door window 14 in their closed positions.

The pillar engageable corners or end portions of the front rail member 22 are channeled in cross-section and are perforated to form two keyhole shaped slots 38. As best shown in FIGURE 4, each slot 38 has a large diameter portion 40 at its forward end and a straight narrow portion 42 extending rearwardly and outwardly therefrom. The bottom wall of each front rail corner is also depressed adjacent the rear end of each slot 26 as shown in FIGURE 2 and thus forms semispherical socket 44.

During movement of the top supporting frame to its closed position, the ball heads of the cable extended latch members normally pass through the large diameter open ends of the slots 38 as the front rail member 22 approaches the windshield and its mounting pillar. Subsequent downward actuation of the latch operating cables retracts the latch members 28 into top locking engagement with the spherical sockets 44 formed adjacent the narrowed rear end portions 42 of the keyhole slots. The keyhole slots 26 and the depressed sockets 44 of the front rail member thus cooperate to form keepers adapted to receive and retain the ball heads of the pillar mounted latch members 28 when retracted downwardly to their top locking positions.

The two cable supported latch members 28 of the illustrative top latching mechanisms are shiftable between their retracted top locking positions and their extended unlatching positions by remote operating levers 46 mounted on the interior of the hinge mounting door jamb portions 12 of the vehicle body by overcenter toggle linkages 48. The latch operating levers are thus located adjacent the forward kick panel of the passenger compartment and are readily accessible for remote unlatching and locking operation of the top latching mechanisms by the vehicle occupants. As shown in FIGURE 2, each latch operating lever 46 is pivotally supported intermediate its ends at 50 on the swinging upper end of a toggle link 52. The lower end of the link 52 is pivotally supported at 54 on a bracket 56 suitably secured on the lower door jamb body portion 12. The lower end of the latch operating lever is pivotally connected at 58 to a swinging member 60 which is suitably attached at 62 to the lower end of a helical spring 64. The upper end of the spring 64 is adjustably threaded on an externally threaded member 66 which is suitably secured to the lower end of the latch operating cable 32.

When the latch operating lever is actuated to its extreme latch retracting position shown in FIGURE 2, the line of action of the cable attached spring 64 is carried overcenter with respect to the pivotal connection 50 against the biasting action of the extended spring. The spring 64 thus acts to maintain both the cable supported latch member and the latch operating lever in their extreme top locking positions. The rate of the spring and the spring deflection effected in rotating each operating lever to this overcenter latch locking position is sufficient to maintain the top in its closed position during vehicle operation. Manual rotation of the lever 46 in a clockwise direction from its top locking position shown in FIGURE 2 swings the pivotal spring connection 58 overcenter with respect to the pivotal toggle link connection 50 and subsequently relieves the spring. Further clockwise rotation of the operating lever acts through the spring and the spring attached cable to shift the latch member 28 upwardly to its extended position. The keeper forming slot and socket of the front rail member 22 are thus disengaged. Subsequent opening movement of the top supporting frame carries the front rail member rearwardly and upwardly and causes the large diameter ends 42 of the two keeper slots to pass over the ball heads of the two latch members.

From the foregoing, it will be apparent that the disclosed embodiment provides an improved top latch mechanism of extremely simple design and is fully capable of providing the various stated objectives and advantages of the invention. It will be further apparent that various changes and modifications might be made in the illustrative embodiment without departing from the spirit and scope of the invention as defined in the following claims.

I claim:

1. A top latching mechanism for a convertible vehicle body including
   a windshield mounting member extending upwardly from the vehicle body forwardly of a body formed passenger compartment,
   top supporting means including a member movable proximate the upper end of the windshield mounting member in closing the convertible top with respect to the passenger compartment,
   said windshield mounting member defining a housing extending upwardly and opening toward said top supporting member in its top closed position,
   a latch member having an enlarged head thereon projecting outwardly of the upper end of said housing,
   flexible means extending through said housing and mounting the latch member for reciprocable movement between a retracted top latching position and an extended top releasing position, and
   said top supporting member having a keeper slot therein enlarged at one end to receive the extended latch head during movement of the top supporting member toward its top closed position and narrowed adjacent its opposite end to engage and retain the retracted latch head upon movement of the top supporting member to its extreme top closed position.

2. A top latching mechanism as set forth in claim 1 further including
   latch operating means connected to the flexible means remotely of the latch member and operable through the flexible means to actuate said latch member between its retracted and extended positions, said latch operating means including
   an actuating lever pivotally mounted and accessible within the passenger compartment and
   spring means interposed between said lever and flexible means and operable to bias said lever to an overcenter position maintaining said latch member in retracted latching engagement with the narrowed slot portions of the top supporting member.

3. A top latching mechanism for a convertible automotive vehicle including a windshield mounting member extending upwardly from the vehicle body forwardly of a body defined passenger compartment,
   a top supporting member movable proximate the upper end of the windshield mounting member in closing the convertible top with respect to the passenger compartment,
   said windshield mounting member defining a guide housing extending upwardly therethrough and opening toward the top supporting member in its top closed position,
   a latch member having an enlarged head thereon,
   flexible means slidably mounted in and extending through said guide housing and mounting said latch member outwardly of the upper opening in the windshield mounting member for reciprocable movement between a retracted top latching position and an extended top releasing position,
   said top supporting member having a keeper forming slot therein enlarged at one end to receive the latch member head during movement of the top supporting member toward its top closed position and narrowed adjacent its opposite end to engage and retain the latch member head upon movement of the top supporting member to its extreme top closed position, and latch operating means connected to the flexible means remotely of the latch member and operable to actuate said latch member between its extended position disengaging the top supporting member and its retracted position effecting top locking engagement with the narrowed end of the keeper slot formed in the top supporting member.

4. In a convertible top latching mechanism as set forth in claim 3, said latch operating means comprising an overcenter toggle linkage including an actuating lever pivotally mounted and accessible within the passenger compartment and spring means interconnecting the actuating lever and said flexible means and swingable by the actuating lever to an overcenter position resiliently maintaining the latching member in retracted latching engagement with the narrowed end of the keeper slot in the top supporting member.

5. A latch mechanism for locking a convertible top in a closed position relative to a vehicle body having two laterally spaced windshield mounting members extending upwardly and forwardly of a body formed passenger compartment and top supporting means including a member movable proximate the upper ends of the windshield mounting members in closing the convertible top with respect to the passenger compartment, each windshield mounting member forming a guide housing extending upwardly and opening toward the closed position of the top supporting member, flexible means extending upwardly through each of said guide housings, a latch member having a shouldered head thereon mounted on each of said flexible means for movement outwardly of each upper housing opening between a retracted top latching position and an extended top releasing position.

said top supporting member having two elongated keeper slots formed adjacent transversely opposite ends thereof, said slots each being enlarged at their ends to receive the shouldered heads of said latching members during movement of the top supporting member approaching its top closed position and being narrowed rearwardly to engage and retain the heads of the latching members upon movement to their retracted top locking positions with the top supporting member in its extreme top closed position, and latch operating means connected to each flexible means remotely of the latching member supported thereon and its windshield mounting member, each of said operating means including an overcenter actuating lever pivotally mounted and accessible within said passenger compartment and spring means interconnecting each of said levers with the adjacent end of one of the flexible means and operable to bias and maintain each of said levers in an overcenter actuated position wherein said latching members are retracted and resiliently maintained in latching engagement within the rearwardly narrowed portions of the keeper slots in the top supporting member.

6. A top latching mechanism for a convertible automotive vehicle body including a windshield mounting member extending upwardly from the vehicle body, a top supporting frame member movable proximate the upper end of the windshield mounting member in closing the convertible top with respect to a body defined passenger compartment, said windshield mounting member forming a guide channel extending therethrough and opening upwardly toward the top supporting member in its top closed position, a latch member slidably mounted and extending through said guide channel and having an enlarged head thereon projecting outwardly of the upper channel opening in the windshield mounting member and reciprocable between a retracted top latching position and an extended top releasing position, said top supporting member having an elongated opening therein with an enlarged portion adapted to receive the head of the latch member during movement of the top supporting member toward its top closed position and having a narrowed portion adapted to engage and retain the latch head upon movement to its retracted position when the top supporting member is in its extreme top closed position, and remote latch operating means connected to latch member below the guide channel of the windshield mounting member and operable to actuate the latch member between its extended position disengaging the top supporting member and its retracted position effecting top locking engagement with the narrowed portion of the opening formed in the top supporting member.

7. In a top latching mechanism as set forth in claim 6, said operating means comprising an overcenter toggle linkage including a toggle link pivotally mounted on said body below the windshield mounting member, a latch operating lever pivotally mounted on said toggle link and accessible for latch operating movement from within the passenger compartment, and resilient means connecting said lever to the lower end of said latch member and swingable by said lever between a latch disengaging position and an overcenter position shifting and maintaining the head of the latch member in retracted latching engagement with the narrowed portion of the opening formed in the top supporting member.

References Cited by the Examiner

UNITED STATES PATENTS 3,135,541 6/1964 Kwasek.
3,216,763 11/1965 Heincelman _____ 296—121

FOREIGN PATENTS 19,883 12/1895 Great Britain.
of 1895

BENJAMIN HERSH, *Primary Examiner.*
C. C. PARSONS, *Assistant Examiner.*